United States Patent [19]

Laginess et al.

[11] Patent Number: 5,661,216
[45] Date of Patent: Aug. 26, 1997

[54] COATING COMPOSITION BASED ON AMINES, ALDIMINES AND ISOCYANATES

[75] Inventors: Thomas J. Laginess, Lambertville, Mich.; Sudhakar Dantiki, Toledo, Ohio; Brian P. Koevenig, Lambertville, Mich.; Rajnikant P. Shah, Holland, Ohio

[73] Assignee: BASF Corporation, Mount Olive, N.J.

[21] Appl. No.: 443,794

[22] Filed: Jul. 31, 1995

Related U.S. Application Data

[63] Continuation of Ser. No. 254,098, Jun. 6, 1994, abandoned.
[51] Int. Cl.⁶ .............................. C08J 5/10; C08K 5/16; C08L 75/00
[52] U.S. Cl. .......... 524/871; 524/872; 524/873; 524/874; 524/237; 528/61; 528/68; 528/52
[58] Field of Search .................. 528/61, 68, 52; 524/871, 872, 873, 874, 589, 590, 237

[56] References Cited

U.S. PATENT DOCUMENTS 5,214,086  5/1993  Mormile et al. .................. 524/237

*Primary Examiner*—Paul R. Michl
*Assistant Examiner*—U. K. Rajguru
*Attorney, Agent, or Firm*—Michael R. Chipaloski

[57] ABSTRACT

A coating composition based on amines, aldimines and isocyanates which forms a polyurea coating or film. These coating compositions are especially useful in the automotive refinish industry due to the cure rate at ambient conditions. The coatings of these compositions can be useful for obtaining low VOC (Volatile Organic Content) levels.

13 Claims, No Drawings

COATING COMPOSITION BASED ON AMINES, ALDIMINES AND ISOCYANATES

This application is a continuation of 08/254,098, filed Jun. 6, 1994, now abandoned.

BACKGROUND OF THE INVENTION

1. Field of the Invention

The present invention relates to new coating compositions based on amines, aldimines, and isocyanates. This coating composition can be cured at ambient conditions or can be cured by baking. The coating composition optionally comprises of pigments and well known paint additives such as fillers, rheology control agents, dispersing agents, solvents, etc. The present invention doesn't consist of any hydroxyl functional compounds. The coating is especially useful for automotive refinish market.

2. Description of Prior Art

Common coating systems which have been used for many years in the coatings industry are polyurethane systems. These systems contain hydroxyl-functional polyols which react with isocyanates giving excellent film properties including durability, toughness, and solvent resistent films. These systems have been popular for automotive coatings, especially automotive refinish. The reason for the popularity in automotive refinish coatings is due to the rate of the reaction between the polyol and isocyanate. This reaction takes place very slow and allows for a long pot life. Pot life being the time after a catalyzed paint sample is mixed when it is still low enough in viscosity that it may still be sprayed. Unfortunately polyurethane coatings take a long time to dry. The reaction can be increased by the addition of an organotin catalyst, but when the catalyst is added, the pot life and dry time both decrease. The desired application would be a combination between long pot life and short dry time.

With increasing Volatile Organic Content (VOC) restrictions, it is difficult to get a balance of pot life and dry time with polyurethane chemistry. The main problem is the hydroxyl functional polyols are high molecular weight resins, which are viscous materials and require a lot of organic solvents in order to reduce to sprayable viscosities. It is also difficult to get the VOC low enough to be compliant with environmental restrictions. By using reactive diluents in combination with the polyol and isocyanates, lower VOC can be achieved. An excellent example of this is U.S. Pat. No. 5,214,086 Mormile et al. (assigned to BASF Corp.). In this patent, the use of diketimines, dialdimines, and hindered diamines as reactive diluents, helps to lower the viscosity and increase the solids, thus enabling coating compositions to reach VOC limits. However, more stringent VOC limits are being set, so it is necessary to try and achieve even lower VOCs. The low molecular weight hydroxyl functional polyols are difficult to use in order to reach these VOC limits. In addition, these polyols react too fast and a sufficient pot life is hard to achieve.

The following patents demonstrate the removal of all or most of the hydroxyl functional polyols and replacing these polyols with other active hydrogen compounds:

U.S. Pat. No. 5,126,170 describes a coating composition based on a two component system, of a polyisocyanate component and an isocyanate-reactive component containing partly or entirely certain secondary polyamines. The use of this coating exhibits fast dry times, but inadequate pot life, i.e., the viscosity of the system increases too rapidly prior to application of the coating compositions to a substrate.

U.S. Pat. No. 5,243,012 uses the same chemistry as the above mentioned patent, but provides longer pot life without significantly increasing the dry time of the coating composition by the use of tin catalyst. The present invention doesn't require the use of tin catalyst. Instead, the addition of aldimine helps to achieve an adequate pot life and dry time. Contrary to the previous patent, the addition of tin to the present invention catalyzes the reaction, making the pot life shorter.

U.S. Pat. Nos. 4,469,831; 4,720,535; 4,504,647; 5,010,161; 5,087,661; all deal with the reaction of active hydrogens from ketimines, aldimines, or oxazolidines with isocyanate. Most of these deal with aldimine or polyaldimine reacted with isocyanates in the presence of moisture in order for the reaction to proceed quickly. The present invention provides adequate dry time without the presence of moisture and uses secondary amines, aldimines, and isocyanates.

U.S. Pat. No. 4,469,831 Bueltjer et al., 4,720,535 Schleier et al., and 4,853,454 Merger et al. (all assigned to BASF AG) all describe compositions of active hydrogen, aldimine functional materials reacted with isocyanate functional prepolymers. The rate of the reaction of this chemistry can be accelerated by the use of acid catalysts. When the aldimine in combination with the acid, is exposed to moisture, the acid helps to hydrolyze the dialdimine. In the present invention, the acid helps to catalyze the reaction of the secondary amine and aldimine with the isocyanate. The presence of moisture is not necessary for this reaction to proceed.

U.S. Pat. No. 3,682,867 describes the use of secondary amines reacted with isocyanates to form polyurea polymers. These new polymers can be mixed with isocyanate and have good stability in the absence of moisture. This system can then be mixed with primary amine groups converted to aldimine or ketimine groups. The polyurea polymers are necessary for the elimination of the problem of gel particle formation which often occurs in the mixing of polyisocyanates with ketimine or aldimine. The importance is that the polyurea needs to be formed first. In the present invention, there is no need for a polyurea prepolymer. The aldimine is compatible with the isocyanate and will not gel.

The present invention deals with the use of secondary amines, aldimines, and isocyanates to achieve low VOC coating compositions. VOC of less than 1.5 Lbs/Gallon can be obtained and still balance pot life and dry times with or without the presence of moisture. Acid catalysts are optional in order to speed up the reaction rate.

SUMMARY OF THE INVENTION

The present invention relates to the use of polyureas in coating systems especially suitable for Automotive industry. This coating can be cured at ambient conditions or can be cured by baking. The coating composition optionally comprises of pigments and well known paint additives such as fillers, rheology control agents, dispersing agents, solvents, etc. The present invention doesn't consist of any hydroxyl functional compounds. The coating is especially useful for automotive refinish market.

The coating composition comprising:

a.) a compound having secondary amine groups b.) at least one isocyanate c.) a compound having the structure

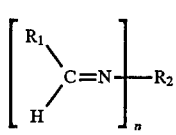

wherein n is 0 to 4, $R_1$ is —H, or alkyl, aryl, cycloaliphatic of substituted alkyl, aryl, or cycloaliphatic group, or heterocyclic group, $R_2$ is aliphatic, aromatic, arylaliphatic or cycloaliphatic group, which may also contain O, N, S, or Si.

The coating composition can be low in volatile organic content (VOC), but not limited to only low VOC compositions. The invention also relates to the reaction behavior of the coating composition being moisture dependent, but moisture is not essential for the reaction to happen. The invention also relates to optionally using catalysts to accelerate the reaction rate of the secondary amine and aldimine compounds with isocyanate compounds. The catalysts used in this invention are aromatic or aliphatic carboxylic acids or arylsulfonic acids as described in the cited prior art. The use of moisture scavengers is optional in order to control the reaction rates in humid conditions.

DETAILED DESCRIPTION OF THE INVENTION

A coating composition comprising:

a.) At least one secondary amine functional compound b.) At least one isocyanate functional resin and c.) a compound having the structure

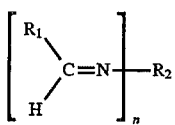

wherein n is 0 to 4, $R_1$ is —H, or alkyl, aryl, cycloaliphatic or substituted alkyl, aryl, or cycloaliphatic group, or heterocyclic group, $R_2$ is aliphatic, aromatic, arylaliphatic or cycloaliphatic group, which may also contain O, N, S, or Si.

The preferred compounds of the structure are obtained from the reaction between a diamine and an aldehyde. The amines preferred in this invention correspond to the formula

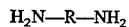

wherein

R is aliphatic, aromatic, cycloaliphatic or arylaliphatic, $C_2$–$C_{18}$, which may be a saturated or unsaturated group, which may also contain O, S, or N. Suitable amines include ethylene diamine, ethylene glycol diamines, propylene glycol diamine, cycloaliphatic diamines. The preferred cycloaliphatic diamine includes compounds having the following structures:

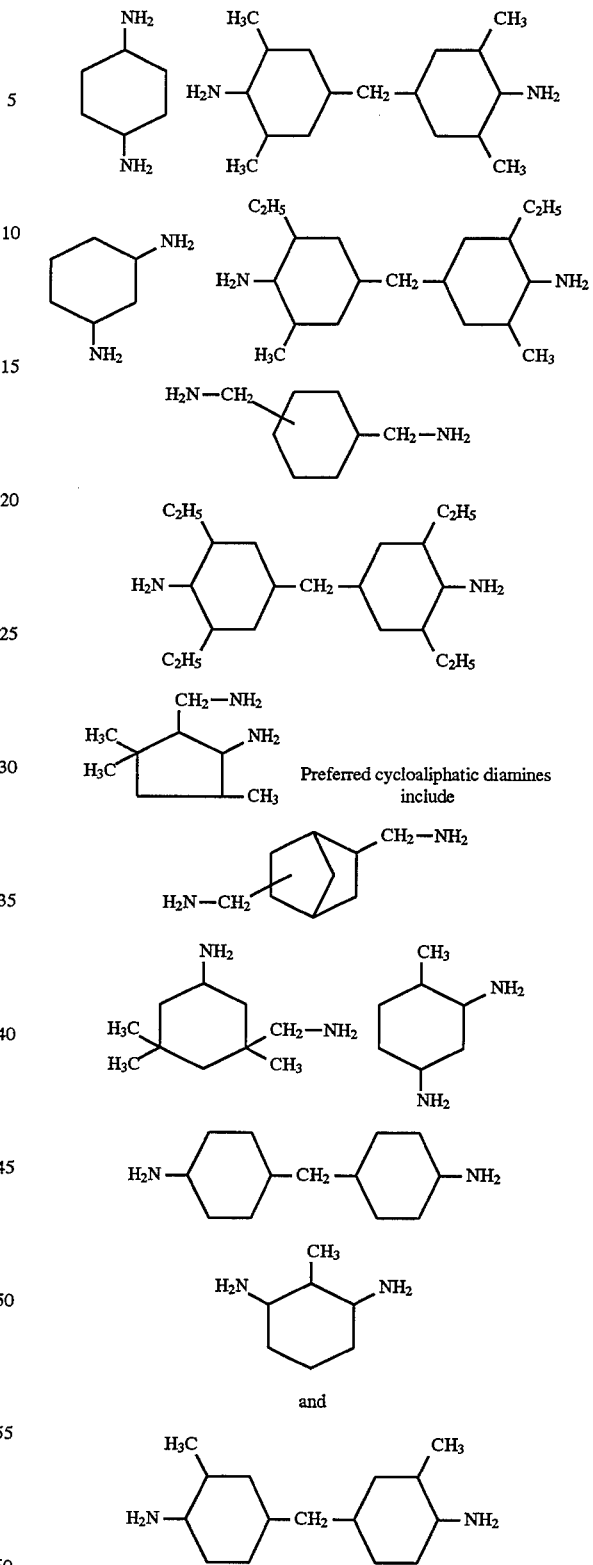

Preferred cycloaliphatic diamines include and

Aldehydes suitable for use in accordance with the invention are those containing 1 to 8 and preferably 3 to 6 carbon atoms such as propionaldehyde, butyraldehyde, and isobutyraldehyde.

This invention also describes a method for reducing the volatile organic content (VOC) of a paint composition, by increasing the solids in a paint composition without adversely affecting the application, durability or performance of the composition.

Useful secondary amines are those materials which may be added to the coating composition and require little or no solvent. In addition to this, they possess at least one active amino hydrogen, thereby allowing them to become crosslinked into the coating matrix. These factors yield an effective increase in solids of the coating composition, thus lowering VOC. Preferred secondary amines are those that are 1500 cps or less viscosity at 100% non-volatile. These would contain at least two active amino hydrogens, allowing them to become part of the crosslink matrix in a continuous scheme. This type of material would most likely be a reaction product via nucleophilic addition of a di-primary amine with two moles of a mono-unsaturated reactant. A material of this type for example, is a reaction product of one mole of 4,4-Methylenebis (2 Methyl) Cyclohexanamine with two moles of diethyl maleate.

Useful isocyanates are di- or polyisocyanates which are aliphatic, cycloaliphatic, or aromatic. Such isocyanates include hexamethylene diisocyanate, 1-methyl-2,4-diisocyanatocyclohexane, isophorone diisocyanate,4,4-diisocyanatodicyclohexyl methane, toluene-2-4-diisocyanate, o-, m-, and p-xylene diisocyanate, 1-5-naphthylene diisocyanate, masked isocyanates or mixtures thereof. It is also possible to use polyisocyanates with isocyanurates, allophanate or uretdione structures. The polyisocyanates may optionally be reacted with a deficit of polyhydroxy compounds, such as water, glycols, polyalkylene glycols, neopentyl glycols, glycerol, trimethylol propane, hexane triol, or alkyd resins, before being used.

This invention also relates to a process of formulating coatings by using aldimine wherein the aldimine is not completely hydrolysed into amine and aldehyde, but probably reacts with the isocyanate as the imine. This is a very important aspect in this invention because when the aldimine hydrolyses into amine and a volatile compound namely the aldehyde, the resulting amine reacts instantaneously with the isocyanate and jeopardizes the pot life and probably the appearance of the paint. Also, the hydrolysis results in volatile organic content in the form of aldehyde and will not be very effective in reducing the VOC. However, mechanisms have been demonstrated whereby these moieties, especially the aldehyde have the capability to react further with functionalities that are present including reaction products of isocyanate and other constituents in the coating composition. These mechanisms therefore would also have the effect of decreasing the volatile organics emitted from the coating composition.

The composition may also contain pigments. These pigments can be introduced by first forming a mill base with the secondary amine functional compound or optionally with the aldimine by conventional techniques, such as sand grinding, ball milling, attritor grinding, or two roll milling to disperse the pigments. The mill base is blended with the film forming constituents as shown in examples which follow.

The invention also relates to optionally using catalysts to accelerate the reaction rate of the secondary amine and aldimine compounds with isocyanate compounds. The catalysts used in this invention are aromatic or aliphatic carboxylic acids or arylsulfonic acids. The preferred acid in these examples is benzoic acid.

The use of moisture scavengers is optional in order to control the reaction rates in humid conditions.

The use of moisture scavenging materials is optional in this application in order to control the water which is released from the pigments, especially in grinding. The removal of this water in the mill base helps to control the reaction rates of the coating composition and allow for the desired properties of the coating film.

Coating compositions described by the present invention find utility in application of ambient film forming and curing such as automotive refinish coatings. It is also suggested that the present invention applies to coatings to be force dried or baked to accelerate the coating curing process. Forced dry conditions range from 100 degrees Fahrenheit to over 325 degrees Fahrenheit. The coating cure process for the present invention may also be accelerated by the utilization of radiant heating or Infra Red emitting devices known to the art.

The following examples are intended to illustrate the invention. All quantities are shown on a weight bases unless otherwise indicated.

EXAMPLES 1, 2, 3, 4, AND 5

The use of secondary amines to obtain desired properties for a coating system for automotive coatings.

COMPONENT #1 is the reaction product of one mole of 4,4'Methylenebis Cyclohexanamine with 2 moles of diethyl maleate.

COMPONENT #2 is the reaction product of one mole of 4,4'Methylenebis (2 Methyl) Cyclohexanamine with 2 moles of diethyl maleate.

PIGMENTS known to the art could be used in the coating composition of the present invention. Suitable pigments are for example titanium dioxide, iron oxide, talcum, calcium carbonate, calcium metasilicate, and barium sulfate. In addition, the use of corrosion inhibiting pigments such as zinc phosphate could be used to prevent corrosion.

ADDITIVES known to the art such as antisettling agents, dispersing agents, flow additives, and rheology modifiers.

ORGANIC SOLVENTS common to the art.

HARDENERS comprises of a group chosen from aliphatic, aromatic, or cycloaliphatic isocyanurates, biurets, allophonates, oxadiazenetriones, or isocyanate functional prepolymers, solubilized with organic solvents.

REACTIVE REDUCER comprises of a reactive diluent solubilized with organic solvents.

|  | Example 1 | Example 2 | Example 3 | Example 4 | Example 5 |
|---|---|---|---|---|---|
| Component #1 | — | 6.2 | 10.3 | 18.6 | 24.8 |
| Component #2 | 41.2 | 35.0 | 30.9 | 22.6 | 16.5 |
| Pigments | 152.2 | 152.2 | 152.2 | 152.2 | 152.2 |
| Additives | 3.3 | 3.3 | 3.3 | 3.3 | 3.3 |
| Organic Solvents | 28.1 | 28.1 | 28.1 | 28.1 | 28.1 |

-continued

|  | Example 1 | Example 2 | Example 3 | Example 4 | Example 5 |
|---|---|---|---|---|---|
| Hardener | 42.9 | 42.9 | 42.9 | 42.9 | 42.9 |
| Reactive Reducer | 10.4 | 10.4 | 10.4 | 10.4 | 10.4 |
| Properties: |  |  |  |  |  |
| Initial Viscosity | 20 | 20 | 20 | 20 | 20 |
| 30 min. viscosity | 31 | 38 | 46 | 67 | >80 |
| Sandability (min.) | 3 hrs. | 3 hrs. | 2 hrs. | 1½ hrs. | 1 |
| VOC (Theoretical) | 2.1 | 2.1 | 2.1 | 2.0 | 2.0 |
| Component 1/2 ratio | 0/100 | 15/85 | 25/75 | 45/55 | 60/40 |

Initial Viscosity is the viscosity of the material measured, immediately after mixing. The viscosity is measured in seconds on a Ford #4 viscosity cup at 25° C.

30 minutes viscosity is the viscosity of the material 30 minutes after the initial mixing. This viscosity measurement helps to determine the pot life of the sample. For these specific examples, a viscosity of 40 to 45 seconds would be the maximum viscosity of the material before it couldn't be sprayed.

Sandability is rated as the time it takes the material to dry, at room temperature (72° F.), before it can be sanded, either wet or dry sanding. Acceptable sanding is when the material doesn't clog the sandpaper with material.

From the examples above, the ratio of components #1 to #2, (secondary amines), helps to determine which ratio is best for a automotive coating. Based on the desired properties of a coating film, the ratio of component #1 to #2 to use can easily be determined. If a fast drying and sanding material is desired, and there is slight concern of pot life, then more of component #1 should be added. If a slow drying and long pot life is desired, then less component #1 and more of component #2 should be added. These examples help to show that secondary amines don't react at the same rate and that reactivity can be altered depending on the structure.

EXAMPLES 6, 7, and 8

The following examples show the great advantages of reactive diluents to coating composition, not to mention the automotive industry, which have very strict Volatile Organic Content (VOC) restrictions in place.

SECONDARY AMINE #1 is the reaction product of one mole of 4,4'Methylenebis (2 Methyl) Cyclohexanamine with 2 moles of diethyl maleate.

ALDIMINE #1 is the reaction product of one mole of 3-Aminomethyl-3,5,5-trimethylcyclohexylamine with two moles of Isobutyraldehyde. The aldimine is solubilized at certain Non-Volatile % with the addition of n-butylacetate.

|  | Example 6 | Example 7 | Example 8 |
|---|---|---|---|
| Secondary Amine #1 | 31.2 | 31.2 | 31.2 |
| Pigments | 160.6 | 160.6 | 160.6 |
| Additives | 3.5 | 3.5 | 3.5 |
| Organic Solvents | 29.7 | 29.7 | 29.7 |
| Hardener | 40.8 | 40.8 | 40.8 |
| Aldimine #1 @ 65% N.V. | 10.4 | — | — |
| Aldimine #1 @ 75% N.V. | — | 10.4 | — |
| Aldimine #1 @ 90% N.V. | — | — | 10.4 |

-continued

|  | Example 6 | Example 7 | Example 8 |
|---|---|---|---|
| Properties: |  |  |  |
| Initial Viscosity | 20 | 20 | 20 |
| 30 min. viscosity | 48 | 44 | 40 |
| Sandability | 2 hrs. | 2 hrs. | 2 hrs. |
| VOC (Theoretical) | 2.2 | 2.16 | 2.1 |

These examples demonstrate how VOC reduction can be accomplished by adding the aldimine reactive diluent in place of solvent. When more aldimine is added, the cure rate or sandability of the material doesn't change, while the pot life for spraying the product increases in the pot.

EXAMPLES 9, 10, 11, 12, and 13

The following examples demonstrates the feasibility of several reactive diluents with the secondary amine and isocyanate chemistry. The following examples clearly show the advantages of aldimine reactive diluents over oxazolidine reactive diluents.

REACTIVE DILUENT #1 is a mixture of 90% of the reaction product of one mole of 3-Aminomethyl-3,5,5-trimethylcyclohexylamine with two moles of Isobutyraldehyde and 10% of n-butylacetate.

REACTIVE DILUENT #2 is a mixture of 90% of a low viscosity oxazolidine, namely 1-aza-3,7-dioxo-bicyclo-2,8-diisopropyl-5-ethyl-octane, mixed with 10% of n-butylacetate.

REACTIVE DILUENT #3 is a mixture of 80% of a low viscosity oxazolidine, namely 4,4-tetramethyl-2-(methylethyl)-n-(2-methyl-propylidene)-3-oxazolidineethanamine, mixed with 20% of n-butylacetate.

REACTIVE DILUENT #4 is a mixture of 90% of the reaction product of one mole of Bis-(p-aminocyclohexyl) methane with 2 moles of Isobutyraldehyde and 10% of n-butylacetate.

REACTIVE DILUENT #5 is a mixture of 90% of the reaction product of one mole of Isophoronediamine with two moles of Isobutyraldehyde and 10% of n-butylacetate.

|  | Example 9 | Example 10 | Example 11 | Example 12 | Example 13 |
|---|---|---|---|---|---|
| Secondary Amine #1 | 51.0 | 51.0 | 51.0 | 51.0 | 51.0 |
| Pigments | 140.9 | 140.9 | 140.9 | 140.9 | 140.9 |
| Additives | 3.1 | 3.1 | 3.1 | 3.1 | 3.1 |
| Organic Solvents | 24.6 | 24.6 | 24.6 | 24.6 | 24.6 |
| Hardener | 43.0 | 43.0 | 43.0 | 43.0 | 43.0 |
| Reactive Diluent #1 | 17.2 | — | — | — | — |
| Reactive Diluent #2 | — | 14.4 | — | — | — |
| Reactive Diluent #3 | — | — | 14.3 | — | — |
| Reactive Diluent #4 | — | — | — | 17.8 | — |
| Reactive Diluent #5 | — | — | — | — | 17.2 |
| Properties: | | | | | |
| Initial Viscosity | 22 | 23 | 21 | 22 | 22 |
| 1 hour Viscosity | 37 | 30 | 31 | 56 | 49 |
| Sandability | 2 hrs. | 8+ hrs. | 8+ hrs. | 2 hrs. | 4 hrs. |
| VOC (Theoretical) | 2.1 | 2.1 | 2.1 | 2.0 | 2.0 |

1 hour viscosity is the viscosity of the material 1 hour after the initial mixing. This viscosity measurement helps to determine the pot life of the sample. For these specific examples, a viscosity of 40 to 45 seconds would be the maximum viscosity of the material before it couldn't be sprayed.

These examples help to prove that an aldimine reactive diluent is more effective than other reactive diluents like oxazolidines. It is important to notice that the aldimine materials react faster than the oxazolidines, as indicated by a higher viscosity at 1 hour and the short sandability time. On the other hand, the reaction of the aldimines is slow enough in a mixed sample to allow for a long pot life, in order to have enough time to spray the material.

EXAMPLES 14, 15, and 16

The following examples demonstrates the advantages of using an aldimine instead of a ketimine with the secondary amine/isocyanate chemistry. These examples also help to prove the importance of the secondary amine in combination with the aldimine.

ALDIMINE #1 is the reaction product of one mole of 3-Aminomethyl-3,5,5-trimethylcyclohexylamine with two moles of Isobutyraldehyde.

KETIMINE #1 is the reaction product of one mole of 3-Aminomethyl-3,5,5-trimethylcyclohexylamine with two moles of Methyl Isobutyl Ketone.

TABLE 4

|  | Example 14 | Example 15 | Example 16 |
|---|---|---|---|
| Secondary Amine #1 | 12.9 | 22.2 | — |
| Pigments | 122.2 | 123.1 | 124.1 |
| Additives | 2.7 | 2.7 | 3.4 |
| Organic Solvents | 45.1 | 43.8 | 45.8 |
| Hardener | 59.3 | 57.8 | 60.8 |
| Ketimine #1 | 37.6 | — | — |
| Aldimine #1 | — | 30.0 | 45.7 |
| Properties: | | | |
| Initial Viscosity | 18 | 16 | 16 |
| 1 hour Viscosity | 26 | 21 | 17 |
| Sandability | 90 min. | 90 min. | 180 min. |
| VOC (Theoretical) | 2.0 | 2.0 | 2.0 |
| Adhesion, ASTM 3359 | 5 | 0 | 4 |

Adhesion is determined by ASTM test method 3359, Standard Test Methods for Measuring Adhesion by Tape Test, Test method B.

The results from these examples shows the aldimine is slower to react in the pot than the ketimine, while the sandability of both are equal. The aldimine is also a better diluent based on the initial viscosities. The use of the aldimine with secondary amine is very important. Without the secondary amine, the reaction in the pot slows down by 2 fold and the sandability increases by 2 fold. From these examples the ketimine had the best adhesion. The major problem with the ketimine is the measured VOC. When the ketimine was reacted with isocyanate, the VOC measured was higher than the theoretical VOC, probably due to the dissociation of ketimine into amine and ketone.

EXAMPLES 17, 18, and 19

The following examples demonstrate the effect of hydroxyl functional resins with the use of secondary amine and aldimine reacted with isocyanate. An organotin catalyst was used to accelerate the hydroxyl and isocyanate reaction.

DIOL RESIN is a very low viscosity diol resin which is 100% Non-volatile. The viscosity of this resin is 700 cps with a hydroxyl number of 145.

ALDIMINE #1 is the reaction product of one mole of 3-Aminomethyl-3,5,5-trimethylcyclohexylamine with two moles of Isobutyraldehyde.

1% TIN CATALYST IN MAK is an organotin (IV) compound, specifically dibutyltin dilaurate mixed with methyl amyl ketone at 1% tin solution.

TABLE 5

|  | Example 17 | Example 18 | Example 19 |
|---|---|---|---|
| Secondary Amine #1 | 19.5 | 19.5 | 53.4 |
| Pigments | 198.3 | 198.3 | 200.8 |
| Additives | 2.6 | 2.6 | 3.0 |
| Organic Solvents | 42.5 | 42.5 | 35.6 |
| Hardener | 83.8 | 83.8 | 85.0 |
| Diol resin | 9.9 | 9.9 | — |
| Aldimine | 19.2 | 19.2 | 16.8 |
| 1% tin catalyst in MAK | — | 4.0 | 10.0 |
| Properties: | | | |
| Initial Viscosity | 22 | 22 | 22 |
| 30 min. viscosity | 90 | 90 | 37 |
| Sandability | 8+ hrs. | 3+ hrs. | 3+ hrs. |
| VOC (Theoretical) | 2.0 | 2.1 | 2.1 |
| Adhesion, ASTM 3359 | 5 | 5 | 5 |

The results from these examples show how the hydroxyl functional resin speeds up the reaction of the secondary amine, aldimine, and isocyanate mixed solution resulting in shorter pot life. The dry time of the film is also extended, due to the addition of hydroxyl. The use of the organotin compound helps to decrease the dry time of the film, while keeping the pot life constant. The removal of the hydroxyl functional resin clearly improves the pot life while also improving the dry time of the film. Clearly the use of hydroxyl functional resins in combination with the secondary amine, aldimine, and isocyanate chemistry hinders the dry time and accelerates the pot life.

EXAMPLES 20, 21, and 22

The following examples shows how different moisture scavengers affects the reaction rate of the secondary amine and aldimine with isocyanate.

MOISTURE SCAVENGER #1 is an oxazolidine moisture scavenger with a structure of 3-ethyl-2-methyl-2-(3-methylbutyl)-1,3-oxazolidine.

MOISTURE SCAVENGER #2 is a synthetic sodium potassium aluminosilicate moisture scavenger.

TABLE 6

|  | Example 20 | Example 21 | Example 22 |
|---|---|---|---|
| Secondary Amine #1 | 27.4 | 27.1 | 27.6 |
| Pigments | 141.3 | 139.9 | 142.7 |
| Additives | 3.1 | 3.1 | 3.1 |
| Organic Solvents | 24.7 | 24.5 | 25.0 |
| Hardener | 53.6 | 53.6 | 53.6 |
| Reactive Reducer | 17.2 | 17.2 | 17.2 |
| Moisture Scavenger #1 | 2.0 | — | — |
| Moisture Scavenger #2 | — | 3.9 | — |
| Properties: | | | |
| Initial Viscosity | 20 | 21 | 21 |
| 1 hr. viscosity, sec. | 34 | 27 | 30 |
| 2 hr. viscosity, sec. | 46 | 34 | 45 |
| Sandability | 3 hrs. | 6 hrs. | 4 hrs. |
| VOC (Theoretical) | 2.1 | 2.1 | 2.1 |
| Adhesion, ASTM 3359 | 5 | 5 | — |
| Pendulum Hardness (1 wk.) | 96 rocks | 98 rocks | — |

2 hour viscosity is the viscosity of the material 2 hours after the initial mixing. This viscosity measurement helps to determine the pot life of the sample. For these specific examples, a viscosity of 40 to 45 seconds would be the maximum viscosity of the material before it couldn't be sprayed.

Adhesion is determined by ASTM test method 3359, Standard Test Methods for Measuring Adhesion by Tape Test, Test method B.

Pendulum Hardness tester consists a steel bar capable of oscillating on two hardened steel hemispheres fixed to the underside of the bar. A panel is held level in a suitable clamp above bench level and the pendulum bar is placed upon the surface to be tested with the steel hemispheres in contact with the panel. The pendulum is allowed to swing, measuring a "damping effect" and the time taken (in number of swings), for the decrease from full amplitude of the swing to a deflection of half amplitude (6" to 3"), is taken as the pendulum hardness (Koenig).

From these results it is clear to see the effect of different moisture scavengers on the reaction rate of the secondary amine and aldimine with isocyanate. The oxazolidine moisture scavenger improves the dry time of the film, but doesn't improve the pot life. The reason might be due to the reaction of oxazolidine with water forming a volatile ketone and a secondary amino alcohol. This amino alcohol can then react with the isocyanate, thus curing the film faster. The synthetic sodium potassium aluminosilicate moisture scavenger produces longer pot life, but also longer dry times of the film. The reason for this could be the efficiency of the moisture scavenger in removing the water, and thus avoiding the effect of moisture in the reaction. The properties of the cured films have minimal difference due to either of the moisture scavengers.

EXAMPLES 23, 24, and 25

The following examples show the influence of the catalysts on the cure reaction of secondary amine, aldimine, and isocyanate.

MOISTURE SCAVENGER #1 is an oxazolidine moisture scavenger with a structure of 3-ethyl-2-methyl-2-(3-methylbutyl)-1,3-oxazolidine.

MOISTURE SCAVENGER #2 is a synthetic sodium potassium aluminosilicate moisture scavenger.

10% TIN CATALYST IN MAK is an organotin (IV) compound, specifically dibutyltin dilaurate mixed with Methyl Amyl Ketone at 10% tin solution.

15% ACID CATALYST IN nBuAc is a solution of 15% benzoic acid in n-Butyl Acetate.

TABLE 7

|  | Example 23 | Example 24 | Example 25 | Example 26 |
|---|---|---|---|---|
| Secondary Amine #1 | 27.4 | 27.4 | 27.4 | 27.4 |
| Pigments | 141.3 | 141.3 | 141.3 | 141.3 |
| Additives | 3.1 | 3.1 | 3.1 | 3.1 |
| Organic Solvents | 27.1 | 24.7 | 24.7 | 24.7 |
| Hardener | 53.6 | 53.6 | 53.6 | 53.6 |
| Reactive Reducer | 17.2 | 17.2 | 17.2 | 17.2 |
| Moisture Scavenger #1 | 2.0 | 2.0 | 2.0 | — |
| Moisture Scavenger #2 | — | — | — | 3.9 |
| 10% Tin cat. in MAK | — | 2.7 | — | — |
| 15% Acid cat. in nBuAc | — | — | 3.8 | 3.8 |
| Properties: | | | | |
| Initial Viscosity | 19 | 19 | 22 | 24 |
| 1 hr. viscosity, sec. | 28 | 38 | 48 | 36 |
| 2 hr. viscosity, sec. | 37 | 62 | — | — |
| Sandability | 3+ hrs. | 3 hrs. | 1.5 hrs. | 1.5 hrs. |
| Dry to touch | 2 hrs. | 1 hr. | 30 min. | 30 min. |
| VOC (Theoretical) | 2.0 | 2.1 | 2.1 | 2.0 |
| Adhesion, ASTM 3359 | — | 2 | 4 | 5 |
| Pendulum Hardness (24 hr.) | 78 rocks | 71 rocks | 77 rocks | 79 rocks |

From the results, examples 23–26 show that the addition of either tin catalyst or acid catalyst improves the cure rate of the secondary amine and aldimine with the isocyanate. Acid catalyst was more efficient than the tin catalyst in the presence of moisture scavengers. These results also proved that a secondary amine and aldimine reacted with isocyanate providing excellent balance of pot life and dry time and also desirable properties of the cured film.

We claim:

1. A non-hydroxy pigmented coating composition consisting essentially of:
   a) at least one secondary amine functional compound,
   b) at least one isocyanate functional resin,
   c) at least one pigment, flier, or extender, and
   d) a compound having the structure

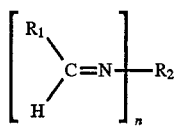

wherein n is 0 to 4, r$_1$ is —H or alkyl, aryl, cycloaliphatic or substituted alkyl, aryl, or cycloaliphatic group, or heterocyclic group, R$_2$ is aliphatic, aromatic, arylaliphatic or cycloaliphatic group, which may also contain O, N, S, or Si.

2. The composition of claim 1 wherein the secondary amine functional compound is used to disperse at least one pigment, filler, or extender.

3. The composition of claim 1 wherein the isocyanate component comprises of a group chosen from aliphatic, aromatic, or cycloaliphatic isocyanurates, biurets, allophonates, oxadiazenetriones, or isocyanate functional prepolymers.

4. The composition of claim 1 wherein the cured film is an undercoat.

5. The composition of claim 1 wherein the cured film is a topcoat.

6. A coating composition of claim 1 which is cured at ambient temperature.

7. A coating composition of claim 1 which is baked to cure.

8. A process for preparing the secondary amine/isocyanate/aldimine composition wherein the pigment is dispersed in the presence of the secondary amine or aldimine and optionally with dispersing agent(s) and optionally with solvent(s).

9. A non-hydroxy coating composition consisting essentially of:
   a) at least one secondary amine functional compound,
   b) at least one isocyanate functional resin, and
   c) a compound having the structure

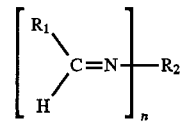

wherein n is to 0 to 4,

R$_1$ is —H, or alkyl, aryl, cycloaliphatic or substituted alkyl, aryl, or cycloaliphatic group, or heterocyclic group, R$_2$ is aliphatic, aromatic, arylaliphatic or cycloaliphatic group, which may also contain O, N, S, or Si.

10. The composition of claim 9 wherein the isocyanate component comprises of a group chosen from aliphatic, aromatic, or cycloaliphatic isocyanurates, biurets, allophonates, oxadiazenetriones, or isocyanate functional prepolymers.

11. The composition of claim 9 wherein the cured film is a clearcoat.

12. A coating composition of claim 9 which is cured at ambient temperature.

13. A coating composition of claim 9 which is baked to cure.

* * * * *